US 7,533,764 B2

(12) United States Patent
Swanson et al.

(10) Patent No.: US 7,533,764 B2
(45) Date of Patent: *May 19, 2009

(54) CLUTCH SYSTEM

(75) Inventors: Craig M. Swanson, Perham, MN (US);
Thomas M. Jagger, Golden Valley, MN (US); George S. Pieper, Champlin, MN (US)

(73) Assignee: Kit Masters Inc., Perham, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/870,629

(22) Filed: Oct. 11, 2007

(65) Prior Publication Data

US 2008/0029362 A1 Feb. 7, 2008

Related U.S. Application Data

(63) Continuation of application No. 11/680,521, filed on Feb. 28, 2007, now Pat. No. 7,311,189, which is a continuation of application No. 11/488,504, filed on Jul. 18, 2006, now Pat. No. 7,201,267, which is a continuation of application No. 10/970,356, filed on Oct. 21, 2004, now Pat. No. 7,104,382.

(51) Int. Cl.
*F16D 25/0632* (2006.01)

(52) U.S. Cl. .............. 192/91 A; 192/85 A; 192/DIG. 1

(58) Field of Classification Search ............. 192/85 A, 192/91 A, DIG. 1
See application file for complete search history.

(56) References Cited

U.S. PATENT DOCUMENTS

| 768,384 A | 8/1904 | Lockwood |
| 1,371,391 A | 3/1921 | Ollard |
| 1,827,348 A | 10/1931 | Bing |
| 2,172,311 A | 9/1939 | Thomas |
| 2,259,461 A | 10/1941 | Eason |
| 2,357,620 A | 9/1944 | Thomas |
| 2,369,328 A | 2/1945 | Watts |

(Continued)

FOREIGN PATENT DOCUMENTS

DE     41 21 240     1/1993

(Continued)

OTHER PUBLICATIONS

"Advantage Reman® Remanufactured Air-Engaged On/Off Fan Drives," Horton Product Catalogs, http://www.hortoninc.com/products/products.asp, printed from the internet on Oct. 27, 2005, 2 pages.

(Continued)

*Primary Examiner*—Richard M. Lorence
(74) *Attorney, Agent, or Firm*—Fish & Richardson P.C.

(57) ABSTRACT

A clutch system may include in certain embodiments a clutch body attached to a drive member such as a drive pulley, wherein the clutch body may be removed from the drive member without disassembling the clutch body. In various embodiments, the clutch body may include two clutch plates which enclose a spring-loaded pneumatic reciprocating assembly that in operation causes the plates to selectively separate and engage one another. In certain embodiments, the clutch body may be readily attached to a associated drive pulley in a single step by installation of a single set of fasteners.

47 Claims, 4 Drawing Sheets

U.S. PATENT DOCUMENTS

| | | | |
|---|---|---|---|
| 2,614,396 A | | 10/1952 | Ratermann |
| 2,637,308 A | * | 5/1953 | Dodge .................... 123/41.08 |
| 2,742,179 A | | 4/1956 | Livers |
| 2,769,932 A | | 11/1956 | Zozulin et al. |
| 3,077,252 A | | 2/1963 | Treer |
| 3,109,555 A | | 11/1963 | Samans |
| 3,185,250 A | | 5/1965 | Glazier |
| 3,202,252 A | | 8/1965 | Schilling |
| 3,253,687 A | | 5/1966 | Young |
| 3,409,305 A | | 11/1968 | Nieland |
| 3,458,122 A | | 7/1969 | Andriussi et al. |
| 3,467,071 A | * | 9/1969 | Elmer .................... 123/41.12 |
| 3,468,402 A | | 9/1969 | Edwards |
| 3,517,683 A | | 6/1970 | Chandler |
| 3,684,397 A | * | 8/1972 | Elmer ........................ 416/39 |
| 3,762,517 A | | 10/1973 | Hanks |
| 4,132,301 A | | 1/1979 | Zabonick |
| 4,199,048 A | | 4/1980 | Ishikawa |
| 4,226,095 A | | 10/1980 | Loken |
| 4,231,457 A | | 11/1980 | Cornish |
| 4,352,365 A | | 10/1982 | Boccardo et al. |
| 4,355,710 A | | 10/1982 | Schilling |
| 4,408,685 A | | 10/1983 | Schilling et al. |
| 4,418,807 A | | 12/1983 | Raines |
| 4,423,803 A | | 1/1984 | Malloy |
| 4,425,993 A | | 1/1984 | Schilling |
| 4,450,947 A | | 5/1984 | Hanks |
| 4,456,110 A | | 6/1984 | Hanks et al. |
| 4,460,079 A | | 7/1984 | Hanks |
| 4,483,430 A | | 11/1984 | Carmichael et al. |
| 4,541,516 A | | 9/1985 | Fenzel |
| 4,570,849 A | | 2/1986 | Klaucke et al. |
| 4,628,953 A | | 12/1986 | Correll et al. |
| 4,657,126 A | | 4/1987 | Hanks et al. |
| 4,750,595 A | | 6/1988 | Dayen et al. |
| 4,766,986 A | | 8/1988 | Dayen et al. |
| 4,770,281 A | | 9/1988 | Hanks |
| 4,826,064 A | | 5/1989 | Dayen et al. |
| 4,830,161 A | | 5/1989 | Hall et al. |
| 4,846,315 A | | 7/1989 | Dayen |
| 4,872,535 A | | 10/1989 | Dayen et al. |
| 4,877,117 A | | 10/1989 | Kniebel et al. |
| 4,909,367 A | | 3/1990 | Elmer |
| 4,934,500 A | | 6/1990 | Hanks et al. |
| 5,059,161 A | | 10/1991 | Bredt |
| 5,215,175 A | | 6/1993 | Fenzel |
| 5,242,036 A | | 9/1993 | Hennessy et al. |
| 5,355,983 A | | 10/1994 | Radomski et al. |
| 5,398,794 A | | 3/1995 | Walberg et al. |
| 5,427,609 A | | 6/1995 | Zoglman et al. |
| 5,586,635 A | | 12/1996 | Nelson et al. |
| 5,611,415 A | | 3/1997 | Davis et al. |
| 5,613,586 A | | 3/1997 | Schilling et al. |
| 5,624,016 A | | 4/1997 | Coulter et al. |
| 5,636,719 A | | 6/1997 | Davis et al. |
| 5,667,045 A | | 9/1997 | Cummings, III |
| 5,704,461 A | | 1/1998 | Vatsaas et al. |
| 5,752,810 A | | 5/1998 | Hein |
| 5,765,672 A | | 6/1998 | Briggs et al. |
| 5,877,117 A | | 3/1999 | Anderson et al. |
| 5,878,858 A | | 3/1999 | Hein |
| 5,896,971 A | | 4/1999 | Hein |
| 5,897,107 A | | 4/1999 | Zierden et al. |
| 5,913,396 A | | 6/1999 | Hein |
| 5,984,070 A | | 11/1999 | Briggs et al. |
| 6,013,003 A | | 1/2000 | Boffelli et al. |
| 6,092,638 A | | 7/2000 | Vatsaas |
| 6,109,871 A | | 8/2000 | Nelson et al. |
| 6,135,029 A | | 10/2000 | Oberjohn |
| 6,253,716 B1 | | 7/2001 | Palmer et al. |
| 6,273,221 B1 | | 8/2001 | Schmidt |
| 6,507,790 B1 | | 1/2003 | Radomski |
| 6,548,929 B2 | | 4/2003 | Nelson et al. |
| 6,600,249 B2 | | 7/2003 | Nelson et al. |
| D478,093 S | | 8/2003 | Bentley |
| 6,811,011 B2 | | 11/2004 | Bastien |
| 6,838,796 B1 | | 1/2005 | Nelson |
| 7,104,382 B2 | | 9/2006 | Swanson et al. |
| 7,201,267 B2 | | 4/2007 | Swanson et al. |
| 7,311,189 B2 | * | 12/2007 | Swanson et al. .......... 192/91 A |
| 2002/0014804 A1 | | 2/2002 | Nelson et al. |
| 2002/0021973 A1 | | 2/2002 | Nelson |
| 2002/0046915 A1 | | 4/2002 | Inoue et al. |
| 2006/0076210 A1 | | 4/2006 | Settineri |
| 2007/0137974 A1 | | 6/2007 | Swanson et al. |

FOREIGN PATENT DOCUMENTS

| | | |
|---|---|---|
| SU | 731918 | 5/1980 |

OTHER PUBLICATIONS

"Bendix® FD-1™ Clutch Type Fan Drive," Bendix Service Data SD-09-8501, 8 pages, Apr. 2004.

"Bendix® FD-2™ Clutch Type Fan Drive," Bendix Service Data SD-09-8503, 8 pages, Apr. 2004.

"Bendix® FD-3™ TorqueMaster Fan Clutch," Bendix Service Data SD-09-8504, 8 pages, Apr. 2004.

"Bendix® FD-L™ Fan Clutch," Bendix Service Data SD-09-8505, 8 pages, Apr. 2004.

"Drive Master® PolarExtreme Spring-Engaged Fan Drives," Horton Product Catalogs, http://www.hortoninc.com/products/products.asp, printed from the internet on Oct. 27, 2005, 2 pages.

"Drive Master® Reman Spring-Engaged Fan Drives," Horton Product Catalogs, http://www.hortoninc.com/products/products.asp, printed from the internet on Oct. 27, 2005, 2 pages.

"Drive Master® Spring-Engaged Fan Drives," Horton Product Catalogs, http://www.hortoninc.com/products/products.asp, printed from the internet on Oct. 27, 2005, 2 pages.

"Drive Master® Two-Speed Fan Drives," Horton Product Catalogs, http://www.hortoninc.com/products/products.asp, printed from the internet on Oct. 27, 2005, 2 pages.

"Engine Cooling Fans. Fan Spacers & Adapters," Horton, Inc., pp. 47-48, Jun. 2002.

"FAIL SAFE™ On/Off K22FA Front Air Fan Clutch Service Guide," Quik-Kool™ Cooling System Components, 2 pages, Jun. 2002.

"FAIL SAFE™ On/Off K22FA Front Air Fan Drives," Quik-Kool™ Cooling System Components, 20 pages, Jun. 2002.

"FAIL SAFE™ On/Off K22FA Front Air Line Installation," Quik-Kool™ Cooling System Components, 2 pages, Jun. 2002.

"FAIL SAFE™ On/Off K22RA Rear Air Clutch Series, 1090-08500" Quik-Kool™ Cooling System Components, 8 pages, Jun. 2002.

"FAIL SAFE™ On/Off K22RA Rear Air Clutch Series 1090-09500," Quik-Kool™ Cooling System Components, 8 pages, Jun. 2002.

"FAIL SAFE™ On/Off K22RA Rear Air Fan Clutch Service Guide," Quik-Kool™ Cooling System Components, 2 pages, Jun. 2002.

"FAIL SAFE™ On/Off K22RA/K22FA Front Air/Rear Air Lining Replacement," Quik-Kool™ Cooling System Components, 2 pages, Jun. 2002.

"FAIL SAFE™ On/Off K22RA/K26RA Fan Hub Series 1077," Quik-Kool™ Cooling System Components, 4 pages, Jun. 2002.

"FAIL SAFE™ On/Off K22RA/K26RA Rear Air Fan Clutch Replacement," Quik-Kool™ Cooling System Components, 2 pages, Jun. 2002.

"FAIL SAFE™ On/Off K26RA Rear Air Fan Clutch Series 1090-09500," Quik-Kool™ Cooling System Components, 8 pages, Jun. 2002.

"FAIL SAFE™ On/Off K26RA Rear Air Lining Replacement," Quik-Kool™ Cooling System Components, 2 pages, Jun. 2002.

"Fan Clutch Overhaul Instructions," Kit Masters, Ramsey, MN, 7 pages, date unknown.

"HT/S Advantage™ Air-Engaged Fan Drives," Horton Product Catalogs, http://www.hortoninc.com/products/products.asp, printed from the internet on Oct. 27, 2005, 2 pages.

"Installation and Service Guide—Kysor Front Air Fan Drives," Kysor Cooling Systems N.A., 24 pages Oct. 1998.

"K-22RA Fan Drive," Kysor Cadillac, 20 pages, Jul. 1996.

"Klondike® Series Replacement Fan Clutch for Kysor's K22RA," Horton, Inc., 2 pages, 2004.

"Klondike® Series Replacement Fan Clutches for K22RA Kits for Kysor's K22RA and K22FA," Horton Product Catalogs, http://www.hortoninc.com/products/products.asp, printed from the internet on Oct. 27, 2005, 3 pages.

"Kysor On/Off Diagnostic Guide," BorgWarner, http://www.ets.borgwarner.com, 2 pages, Jun. 2002.

"PolarExtreme HT/S Reman Fan Drives," Horton Product Catalogs, http://www.hortoninc.com/products/products.asp, printed from the internet on Oct. 27, 2005, 2 pages.

"The Kysor K-22RA Fail Safe™ On-Off Fan Clutch," BorgWarner Cooling Systems, Apr. 2000, 2 pages.

"Welcome to Kitmasters," [online]. Kit Masters, 2004, [retrieved on Dec. 14, 2000]. Retrieved from the Internet: <URL: www.kit-masters.com>, 7 pages.

Bendix Catalog Index, 20 pages, date unknown.

BorgWarner 2004 Product Catalog, front and back covers and pp. 92-256 and 341-389.

Horton Catalog, Mar. 1998, 70 pages.

Horton Heavy-Duty Vehicle Components Catalog, Jul. 2004, front and back covers and Table of Contents, pp. I-V.

Letter from Alan M. Koenck, dated Sep. 24, 2008, 2 pages.

Horton Price Quotation, 1 page, date not available to applicant.

Drawings of Horton, Inc., Part No. 984145, 2 pages, date unavailable to applicant.

Drawings of Horton, Inc., Part No. 984149, 2 pages, date unavailable to applicant.

Drawings of Horton, Inc., Part No. 984152, 2 pages, date unavailable to applicant.

Horton, Inc., "Rear Air Drivemaster," 2001, 33 pages.

* cited by examiner

CLUTCH SYSTEM

CROSS-REFERENCE TO RELATED APPLICATION

This application is a continuation of U.S. application Ser. No. 11/680,521 filed Feb. 28, 2007 and entitled "Clutch System and Method" (now U.S. Pat. No. 7,311,189), which is a continuation of U.S. application Ser. No. 11/488,504 filed on Jul. 18, 2006 and entitled "Clutch System and Method" (now U.S. Pat. No. 7,201,267), which is a continuation of U.S. application Ser. No. 10/970,356 filed on Oct. 21, 2004 and entitled "Clutch System" (now U.S. Pat. No. 7,104,382). The entire contents of these prior applications are incorporated herein by reference.

TECHNICAL FIELD

This invention relates to a rotational control apparatus, and certain embodiments relate more particularly to a clutch apparatus.

BACKGROUND

Vehicle transmission systems, cooling systems, and braking systems often use clutches or like devices to selectively transmit rotational forces from a drive shaft to an output member. Conventional clutch devices include an opposing pair of engagement surfaces that can be compelled toward or away from one another using an electrical, mechanical, pneumatic, or hydraulic actuation system. In general, the actuation system causes some relative axial shifting within the clutch device. Such axial movement is used to engage (or disengage) the opposing engagement surfaces, which rotationally interconnects (or rotationally disconnects) the drive shaft and the output member.

In clutch devices using pneumatic or hydraulic actuated systems, a piston may be acted upon by a set of springs to bias the piston toward one of the engaged or disengaged positions. Fluid pressure may act upon the piston, in a direction opposite to that of the spring force, to cause the piston portion to be axially shifted. Such axial movement is used to engage (or disengage) the opposing engagement surfaces, thus selectively controlling the rotation between the drive shaft and the output member.

Clutch devices may require repair or replacement if the engagement surfaces have worn beyond their useful life or if a component is not properly functioning. For instance, seals and clutch engagement surfaces may wear over time and require replacement.

The design of the clutch device can have a significant effect on the time and cost of repair or replacement of component parts. If a clutch device has multiple pieces that must be disassembled before the clutch device can be removed from the drive shaft, the labor costs associated with the repair or replacement of the clutch device may increase. In addition, if a clutch device includes components that are spring biased, extra tooling may be required to clamp those components in place as clutch device is disassembled or removed.

The location and number of seals such as O-rings in the clutch device may also affect the time and cost associated with repairing or replacing clutch devices. If a seal fails and starts to leak, the time required to locate which particular seal is broken may increase if the clutch device has a larger number of seals. Furthermore, the location of the seals may affect the likelihood of contaminants entering the fluid space. If a seal is disposed between two surfaces that move both axially and rotationally relative to one another, the seal may be more susceptible to leakage.

The longevity of the clutch device, and thus the repair interval, may be increased by reducing wear factors such as vibration. Clutch designs built with more liberal tolerances and clutch designs that allow greater degrees of inter-part vibration may have a shorter useful life.

SUMMARY

A clutch system may include in certain embodiments a clutch body attached to a drive member such as a drive pulley, wherein the clutch body may be removed from the drive member without disassembling the clutch body. In various embodiments, the clutch body may include two clutch plates which enclose a spring-loaded pneumatic reciprocating assembly that in operation causes the plates to selectively separate and engage one another. In certain embodiments, the clutch body may be readily attached to an associated drive pulley in a single step by installation of a single set of fasteners.

In some embodiments, a rotation control apparatus may include a clutch member removably mounted to a drive pulley. The clutch member may have a hub portion and a piston portion. The hub portion may be selectively movable in a rotational direction relative to the drive pulley and substantially stationary in an axial direction relative to the drive pulley. The piston portion may be selectively movable in the axial direction relative to the hub portion and substantially stationary in the rotational direction relative to the hub portion. The clutch member may be removable from the drive pulley while the hub portion remains assembled with the piston portion.

In another embodiment, a rotational control apparatus includes a drive member rotatably mounted on a support shaft. The drive member may have a first engagement surface. A clutch member may be removably mounted to the drive member. The clutch member may comprise a piston portion assembled with a hub portion. The piston portion may be selectively movable in an axial direction relative to the hub portion and substantially stationary in a rotational direction relative. The piston portion may have a second engagement surface to selectively contact the first engagement surface. The clutch member may further include a channel in fluid communication with the piston portion, and a biasing member to urge the second engagement surface against the first engagement surface. The clutch member may be removable from the drive member while the hub portion remains assembled with the piston portion.

These and other embodiments may be configured to provide one or more of the following advantages. First, the clutch member may be readily removed from the drive member upon removal of a single set of fasteners. Second, the clutch member may have a self-contained configuration that eliminates the need for additional clamps or tooling when removing the clutch member from the drive member. Third, the clutch member may have a reduced number of seals and leakage paths, thus reducing the number of seals along the periphery of the fluid-receiving chamber. Fourth, the seal member along the periphery of the fluid-receiving chamber may not rotate relative to an adjacent part, which may in turn improve seal quality and reduce the likelihood of contamination in the fluid system. Fifth, the clutch member may have a fluid-receiving chamber that is wholly within the removable clutch member, which may also reduce the likelihood of contamination in the fluid system. Sixth, a spline connection in the clutch member may reduce vibration between internal components of the clutch member. Seventh, the clutch member may use a single spring to urge the piston portion toward an engaged (or disengaged) position, which may simplify the assembly process during manufacture and repair. Some or all of these and other advantages may be provided by the clutch systems described herein.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

A number of embodiments of the invention include a rotational control apparatus that provides simplified repair or replacement. A rotation control apparatus may include a clutch member that is removably mounted to a drive member. In some embodiments, the clutch member may be removed from the drive member without disassembly of the clutch member's component parts.

Figure 1:
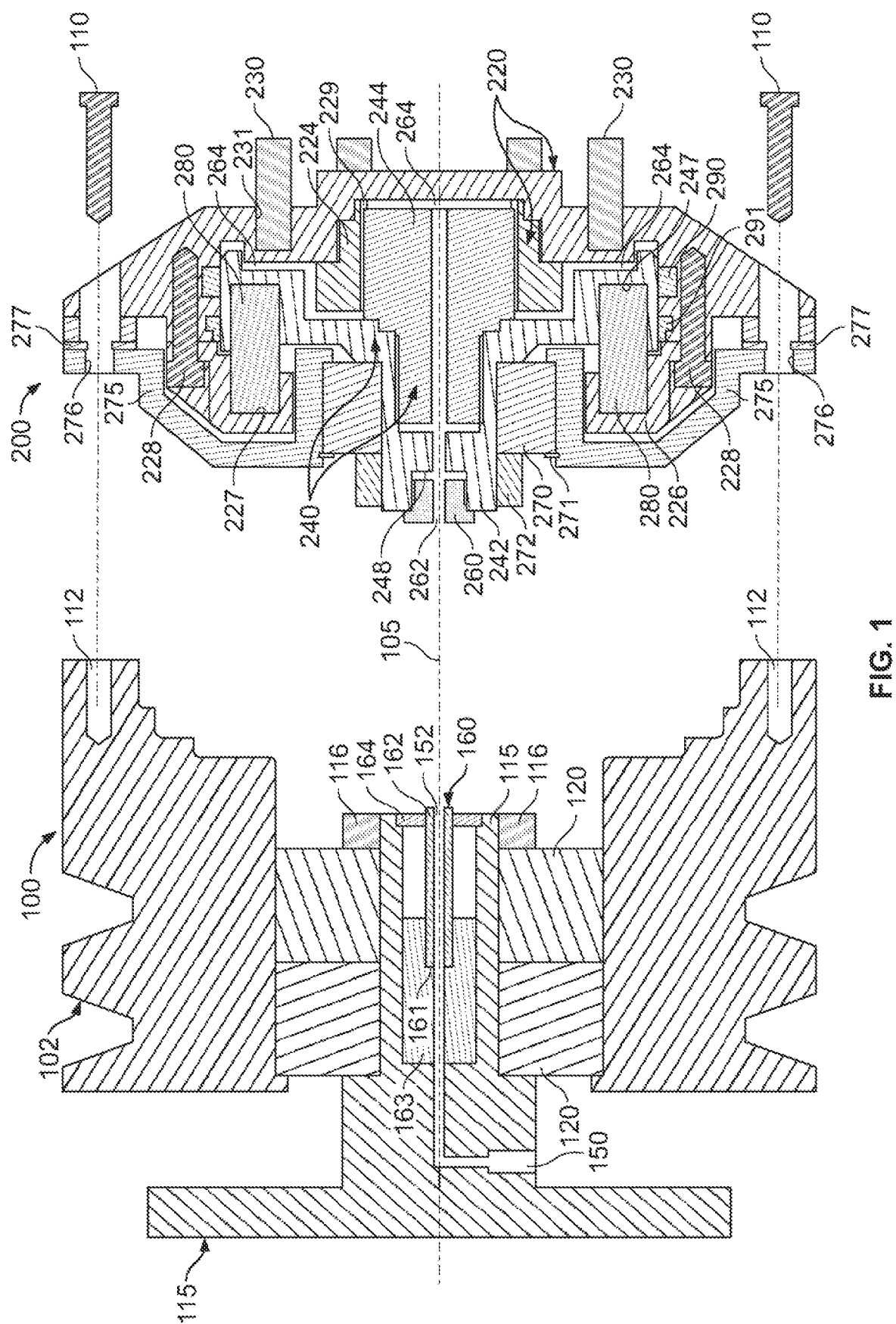
FIG. 1 is an exploded cross-sectional view of a rotational control apparatus in accordance with certain embodiments of the invention.
Figure 2:
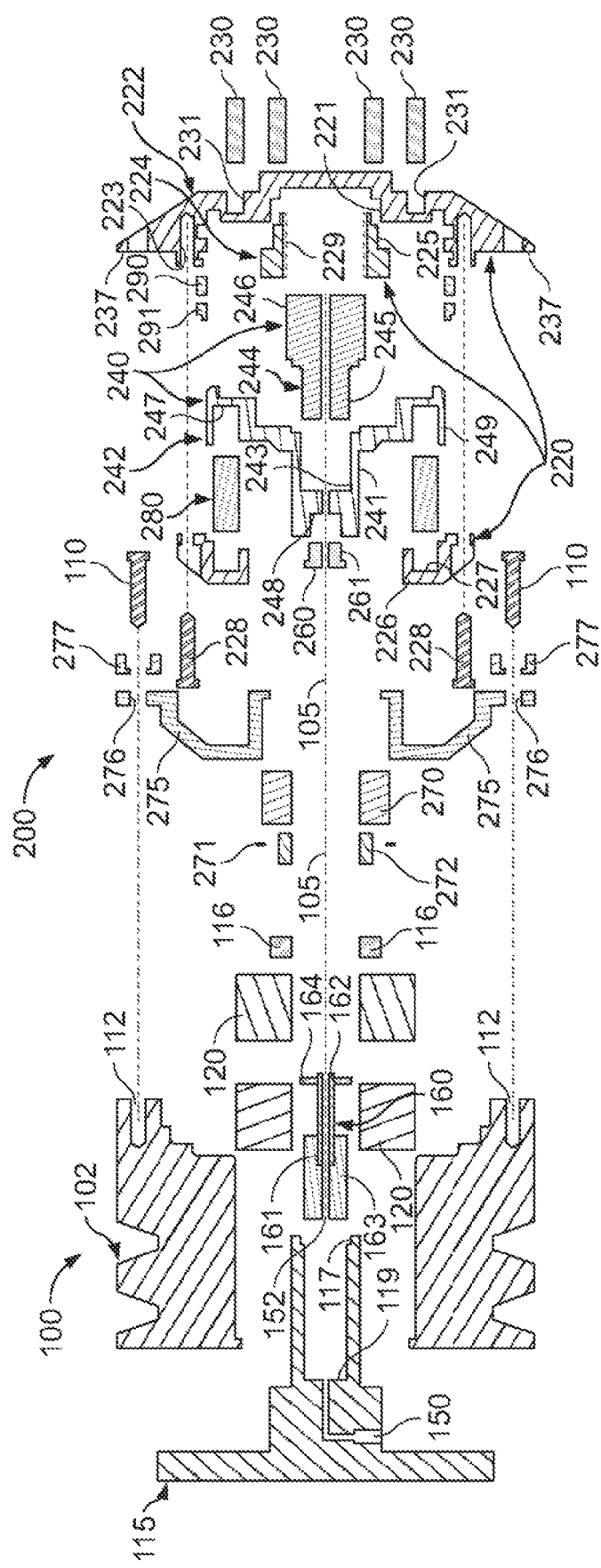
FIG. 2 is another exploded cross-sectional view of a rotational control apparatus of FIG. 1.

Referring to FIGS. 1-2, a drive member 100 is rotatably coupled to a support member 115 by one or more bearings 120. A nut or collar device 116 is secured to the support member 115 and is abutted to the bearing 120 so that the bearings 120 remain substantially fixed in the axial direction relative to the support member 115. The drive member 100 receives one or more drive inputs, such as belts, chains, gears or the like, to force the drive member 100 to rotate in a particular direction about an axis 105. In this embodiment, the support member 115 is a substantially stationary shaft, and the drive member 100 is illustrated as a drive pulley that includes an input portion 102. Rotational power from a motor or the like may be transmitted through one or more drive inputs (not shown in FIGS. 1-2) to the input portion 102, thus causing the drive pulley 100 to rotate about the central axis 105 of the support shaft 115.

A fluid supply input 150 extends into the support member 115 for connection to a fluid supply reservoir (not shown in FIGS. 1-2). A supply channel 152 extends from the fluid supply input 150 in a substantially axial direction along the central axis 105. In this embodiment, the supply channel 152 extends through a cylindrical outlet 160, which has a mating end 162 to mate with a face seal 260 of the clutch member 200. The outlet 160 may also include a spacer 164 that fits into a shoulder 117 of the support member 115, thereby aligning the outlet 160 with the central axis 105.

Still referring to FIGS. 1-2, the outlet 160 has an insert end 161 that is fit into a biasing member 163. The biasing member 163 of the outlet 160 is fit into an axial cavity 119 of the support member 115. The biasing member 163 may be a spring or block of elastic material that biases the mating end 162 in a substantially axial direction toward the face seal 260. As such, when the clutch member 200 is mounted to the drive member 100 (see, for example, FIG. 3), the mating end 162 is pressed against the face seal 260 to form a mechanical seal. Accordingly, the fluid may be transmitted from the fluid supply input 150 through the outlet 160 and the face seal 260 to the fluid-receiving chamber 264 of the clutch member 200. In some embodiments, the mating end 162, the face seal 260, or both may comprise metals, polymers, or composite materials that can substantially maintain the mechanical seal therebetween while the clutch member 200 is selectively rotated relative to the support member 115. In one example, the mating end 162 and the face seal 260 comprise a hardened, polished steel material. This configuration of the mechanical seal between the mating end 162 and the face seal 260 may eliminate the need for a cap member that is fit over the mating end 162 and extends to the inner circumference of the drive pulley 100 so as to seal the radial area inside the drive pulley 100 and retain a face seal 260.

The fluid transmitted to the fluid-receiving chamber 264 of the clutch member 200 may be any suitable liquid or gas, as described in more detail below. Such fluids may be received, for example, from a pneumatic air supply system or a hydraulic oil supply system.

Referring more closely to FIG. 1, the clutch member 200 is removably mounted to the drive pulley 100. A fluid channel 262 extending axially through the face seal 260 is substantially axially aligned with the central axis 105. In this embodiment, the clutch member 200 is removably mounted to the drive pulley 100 using bolts 110 that screw into threaded cavities 112 in the drive pulley 112. Alternatively, clamps may be used to removably couple the clutch member 200 to the drive member 100.

Such a configuration of the clutch member 200 may permit the clutch member 200 to be readily removed from the drive pulley 100. The clutch member 200 may be removed and/or replaced in a single operation by removing a single set of bolts 110. This configuration may obviate the need to disassemble parts of the clutch member 200 during a replacement or repair operation. Moreover, the clutch member 200 in certain configurations may lessen or eliminate the need for additional clamps or tooling when removing the clutch member 200 from the drive member 100, as described in more detail below. Accordingly, the time and costs associated with the repair or replacement of the clutch member 200 may be significantly reduced.

Referring again to FIGS. 1-2, the clutch member 200 includes a piston portion 220 that is movably assembled with a hub portion 240. The piston portion 220 is movable in an axial direction relative to the hub portion 240 and is substantially stationary in a rotation direction relative to the hub portion 240. In this embodiment, the motion of the piston portion 220 relative to the hub portion 240 is accomplished by way of a spline connection. The piston portion 220 includes a first spline member 224 that is substantially mated with a second spline member 244 of the hub portion 240. The splines 229 of the first spline member 224 are complimentary to the splines 246 of the second spline member 244 such that the spline members 224 and 244 are slidable relative to one another in an axial direction and are substantially stationary relative to one another in a rotational direction. In other embodiments, the motion of the piston portion 220 relative to the hub portion 240 may be accomplished using one or more bushings that permit relative axial movement and anti-rotation dowels that substantially prevent relative rotation between the piston portion 220 and the hub 240.

In the embodiment depicted in FIGS. 1-2, the piston portion 220 includes an output member 222, the first spline member 224, and a spring-engaging member 226. The spring-engaging member 226 has a radially extending surface 227 that abuts with a spring 280. The spring-engaging member 226 is fixedly coupled to the output member 222, for example, by bolts 228 screwed into threaded cavities 223 in the output member 223. The first spline member 224 is fixedly coupled to an output member 222, for example, by threads on an external surface 225 of the first spline member 224 that are mated into a threaded cavity 221 of the output member 222. Alternatively, the first spline member 224 may be fixedly coupled to an output member 222, for example, by bolts screwed into threaded cavities in the output member 222. The output member 222 includes studs 230 that are configured to receive an output device, such as fan blades (not shown in FIGS. 1-2). Accordingly, the clutch member 200 may engage the drive pulley 100 so that the output member 222 rotates with the drive pulley 200 to spin the fan blades. In such embodiments, the piston portion 220 of the clutch member 200 may have a dual function to selectively engage the drive pulley 100 and to act as the output for the rotational motion. The studs 230 may be mounted into cavities 231 in the output member 222. In the presently preferred embodiment, the cavities 231 do not extend completely through the output member 222, thereby obviating the need for additional seals between the studs 230 and the fluid-receiving chamber 264. In other embodiments, the studs 230 may be threaded bolts that are inserted through threaded apertures in the output member 222 and extend forward of the output member 222.

Still referring to FIGS. 1-2, the hub portion 240 includes a hub 242 and the second spline member 244. The second spline member 244 is fixedly coupled to the hub 242, for example, by threads on an external surface 245 of the second spline member 244 that are mated into a threaded cavity 243 of the hub 242. Alternatively, the second spline member 244 may be fixedly coupled to the hub 242, for example, by bolts screwed into threaded cavities in the hub 242. The hub 242 includes a cavity 248 configured to receive at least a portion of the face seal 260, and the fluid channel 262 extends axially along the central axis 105 through both the hub 242 and the second spline member 244. The face seal 260 may include threads on an external surface 261 that mate with the cavity 248 of the hub 242. In an alternative embodiment, the threaded cavity 243 may extend completely through the hub 242 such that the second spline member 244 mates with the face seal 260. In such an embodiment, the face seal 260 may mate with a cavity in the second spline member 244 similar to the cavity 248 in the hub 242.

At least one bearing 270 is disposed between the hub 242 and a fixed plate 275. The fixed plate 275 is mounted to the drive pulley 100 using the bolts 110 that are positioned through apertures 276 and screwed into cavities 112. As such, the fixed plate 275 is secured to the drive pulley 100 and rotates along with the drive pulley. The bearing 270 permits the hub portion 240 (including the hub 242) to rotate independently of the fixed plate 275 and the drive pulley 100. In this embodiment, the bearing 270 is disposed along an outer circumferential surface 241 of the hub 242. The bearing 270 may be secured to the hub 242 and the fixed plate 275 using any number of securing means, such as collar devices, locking nuts, locking rings, tongue and groove arrangements, or the like. In this embodiment, the bearing 270 is secured to the hub 242 using a locking nut 271 so that the bearing 270 remains substantially stationary relative to the hub 242 in the axial direction. The bearing 270 is secured to the fixed plate 275 using a locking ring 271 such that the bearing 270 remains substantially stationary relative to the fixed plate 275 in the axial direction. As such, the hub portion 240 may rotate independently of the fixed plate 275 and drive pulley 100, but the hub portion 240 remains substantially stationary in the axial direction relative to the fixed plate 275 and drive pulley 100.

Still referring to FIGS. 1-2, the hub 242 includes a spring-engaging surface 247 that abuts with the spring 280. In this embodiment, the spring 280 is a single, coiled spring that has an inner and outer diameter to fit securely within the spring-engaging member 226 of the piston portion 220. Using only a single spring may simplify assembly and disassembly of the clutch member 200 during manufacture or repair. Because only one spring must be placed in the spring-engaging member 226, less time is required to properly align the spring 280 during assembly. Alternatively, other embodiments may use a more complex arrangement having a greater number of smaller springs that are positioned adjacent one another within the spring-engaging member 226 of the piston portion 220.

When the clutch member 200 is assembled as shown in FIG. 1, the spring 280 is compressed between the spring-engaging surface 227 of the piston portion 220 and the spring engaging surface 247 of the hub portion 240. Such an arrangement urges the piston portion 220 in an axial direction toward the drive pulley 100. Thus, in this embodiment, the spring 280 biases the piston portion 220 such that an engagement surface 237 of the piston portion 220 is urged against a clutch material 277, which is mounted to the drive pulley 100 using the bolts 110. When the engagement surface 237 presses against the clutch material 277, the clutch member 200 engages the drive pulley 100, and the piston portion 220 and the hub portion 240 rotate with the drive pulley 100.

Still referring to FIGS. 1-2, the clutch member 200 may disengage the drive pulley 100 when fluid is introduced into the chamber 264 under sufficient pressure to axially shift the piston portion 220 relative to the hub portion 240. When the engagement surface 237 is shifted away from the clutch material 277 (see, for example, FIG. 4), the piston portion 220 and the hub portion 240 are no longer driven by the rotation of the drive pulley 100 and are free to independently rotate (or stop rotating) via the bearing connection 270. As previously described, fluid may enter the chamber 264 through the fluid channel 262. In this embodiment, the fluid-receiving chamber 264 is at least partially defined by the space between the output member 222 and the hub 242. The fluid may pass through small gaps in the spline connection between the first spline member 224 and the second spline member 244. When a predetermined amount of fluid pressure has built up in the chamber 264, the output member 222 is forced in an axial forward direction away from the drive pulley 100, thus overcoming the bias of the spring 280 to urge the piston portion 220 toward the drive pulley 100.

Still referring to FIGS. 1-2, the fluid-receiving chamber 264 is disposed internally in the clutch member 200. In this embodiment, the fluid in the chamber 264 may have only one possible leak path, which is along the circumferential surface 249 of the hub 242. A seal 290 is disposed along the periphery of the leak path between the circumferential surface 249 of the hub 242 and the output member 220. The seal 290 is positioned as such to prevent fluid leakage through the leak path. Thus, a fluid leak may be quickly detected and repaired by checking the seal 290 at the circumferential surface 249 and by checking the mechanical seal at the face seal 260. By reducing the number of seals in the clutch member design, the time and cost associated with detecting which seal is faulty may be significantly reduced.

In this embodiment, the seal 290 for the fluid-receiving chamber 264 is internal to the clutch member 220 and is disposed between two surfaces that do not rotate relative to one another about the central axis 105. As previously described, the piston portion 220 may shift in the axial direction relative to the hub portion 240, so the seal may endure a sliding motion between the circumferential surface 249 and the output member 222. The piston portion 220 remains substantially stationary relative to the hub portion 240 in the rotational direction, so the seal 290 does not endure a rotational motion. When the seal 290 is internal to the clutch member 200 and is limited to such minimal sliding motion, the possibility of contaminants entering the chamber 264 through the seal 290 may be significantly reduced. Such a reduction is contamination may increase the longevity the clutch member 200 and may reduce the need for repair or replacement.

Referring to FIGS. 1-2, a wiper seal 291 may also be disposed between the circumferential surface 249 of the hub portion 240 and the output member 222 of the piston portion 220. In this embodiment, the wiper 291 may slide in an axial direction when the piston portion 220 shifts relative to the hub portion 240. The wiper 291 is positioned against the circumferential surface 249 so as to prevent or limit any contaminants that may pass into the fluid-receiving chamber. The wiper 291, the seal 290, or both may comprise a material that is suitable to endure the sliding motion while limiting the flow of fluid or contaminants. Such suitable materials may include polymers, rubber materials, composite materials, or the like. Depending on the manufacturing tolerances of the piston portion 220 and the hub portion 240, a guide band (not shown in FIGS. 1-2) may be disposed between the circumferential surface 249 and the output member 222 to prevent excess metal-on-metal contact between the circumferential surface 249 and the output member 222. If such a guide band is implemented, the guide band is preferably disposed between the seal 290 and the wiper 291.

Referring more specifically now to FIG. 1, the clutch member 200 may have a self-contained construction such that the components of clutch member 200 (e.g., the piston portion 220, the hub portion 240, the spring 280, and so forth) remain in an assembled state even after the clutch member is removed from the drive pulley 100. In the embodiment shown in FIG. 1, the clutch member 200 may be removed from the drive pulley 100 by removing the bolts 110 from the mounting cavities 112. Removing these bolts 110, however, does not permit the internal spring to move the components of the clutch member 200 apart from another and thereby cause disassembly of the clutch member 200 (e.g., the spring 280 is not be free to unexpectedly expand and separate the components when a worker attempts to remove the clutch member 200 from the drive pulley 100). The locking nut 272, locking ring 271, and other such devices may be subsequently removed to disassemble the clutch member 200 at the appropriate time. Accordingly, the clutch member 200 may be removed from the drive pulley 100 without the use of clamps or extra tooling to retain the clutch member 200 in its assembled position.

In operation, the clutch member 200 may selectively engage the drive member 100 so that the rotation of the output member 222 is controlled. As previously described, the depicted embodiment of the clutch member 200 may disengage the drive pulley 100 when fluid is introduced into the chamber 264 under sufficient pressure to axially shift the piston portion 220 relative to the hub portion 240. When the engagement surface 237 is shifted away from the clutch material 277, the piston portion 220 and the hub portion 240 are no longer driven by the rotation of the drive pulley 100 and are free to independently rotate (or stop rotating) via the bearing connection 270.

Figure 3:
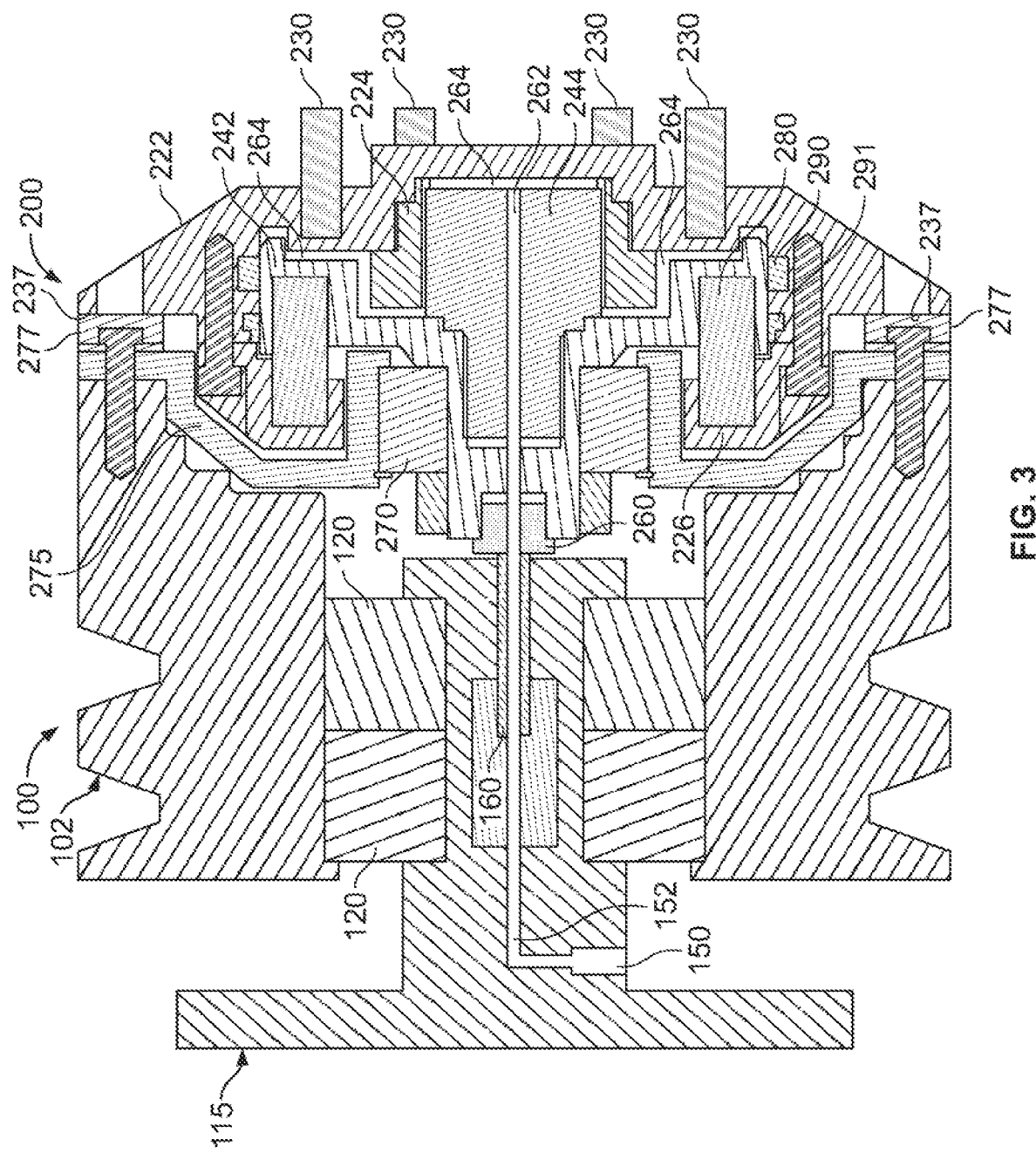
FIG. 3 is a cross-sectional side view of the rotational control apparatus FIG. 1.

Referring now to FIG. 3, the clutch member 200 is mounted to the drive pulley 100 and the piston portion 220 is shown in an engaged position. In this embodiment, the spring 280 is disposed between the hub portion 240 and the piston portion 220 such that the spring 280 urges the piston portion 220 in a rearward axial direction toward the drive pulley 100. The engagement surface 237 of the piston portion 220 is pressed against the clutch material 277, which is mounted to the drive pulley 100. The engagement surface 237 is urged against the clutch material 277 with sufficient force so that the piston portion 220 rotates along with the clutch material 277, which is mounted to the drive pulley 100. As such, the output member 222 of the piston portion 220 rotates substantially synchronously with the rotation of the drive pulley 100 about the central axis 105. When the piston portion 220 is in the engaged position, the output device (such as a fan) that is mounted to the studs 230 of the output member 222 also rotates with the drive pulley 100. Although the hub portion 240 is not directly engaged with the drive pulley 100 or the clutch material 277, the hub portion 240 rotates with the piston portion 220 due to the spline connection between first and second spline members 224 and 244. Such a configuration limits the wear on the seal 290 because the seal 290 does not endure rotational motion between the hub 242 and the output member 222.

Figure 4:
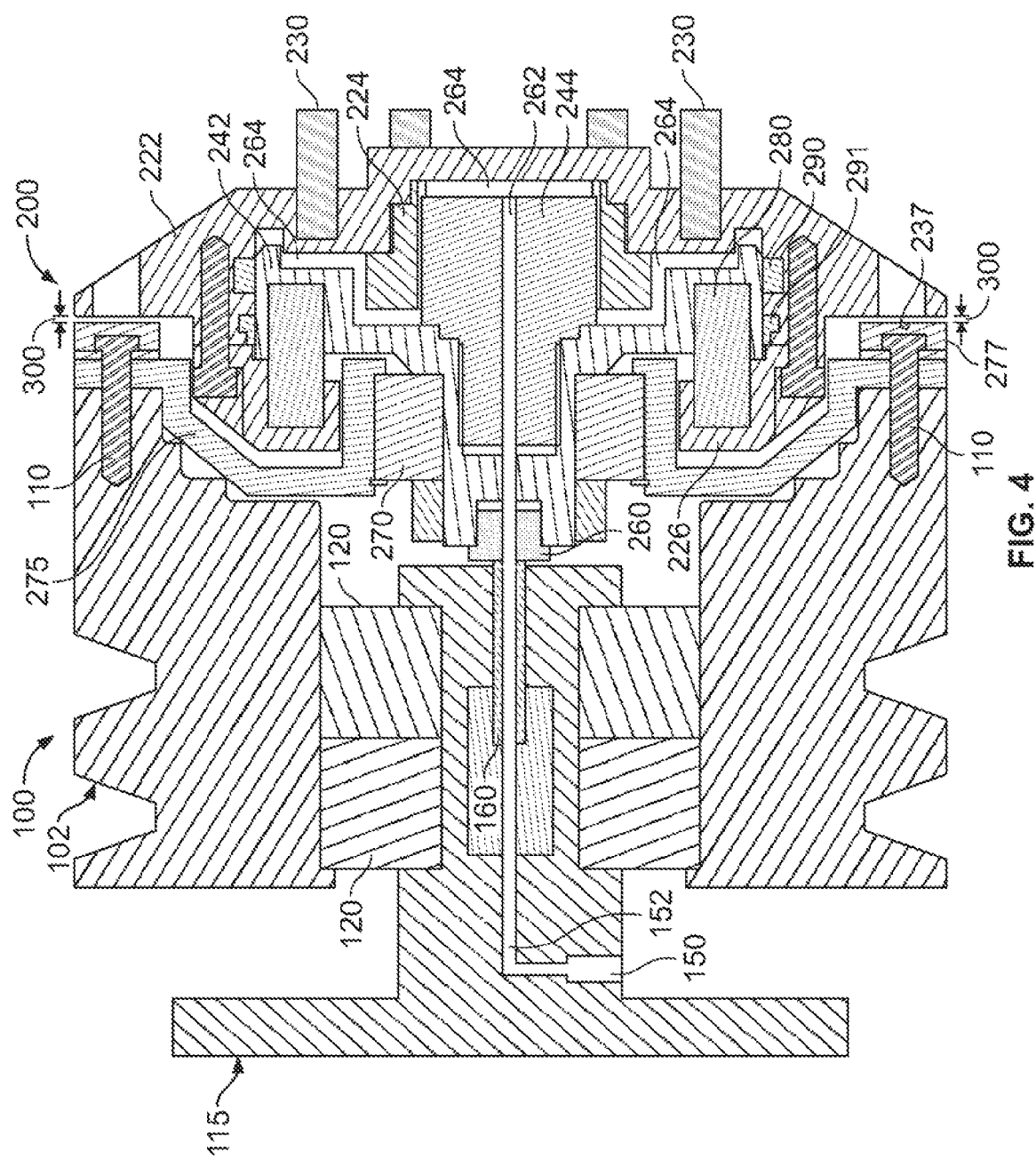
FIG. 4 is another cross-sectional side view of the rotational control apparatus of FIG. 1.

Referring now to FIG. 4, the piston portion 220 is shifted forward in the axial direction away from the drive pulley 100 such that the piston is in a disengaged position. In this embodiment, the engagement surface 237 of the piston portion 220 is spaced from the clutch material 277 by an offset 300. This offset 300 causes the piston portion 220 to disengage with the clutch material 277 so that the rotational motion from the drive pulley 100 is not transferred to the output member 222. When the piston portion 220 is in the disengaged position, the piston portion 220 and hub portion 240 are free to rotate independently from the drive pulley 100 due to the bearing connection 270. Accordingly, the piston portion 220 and the hub portion 240 may stop rotating even though the drive pulley 100 continues to rotate.

Referring to FIGS. 3-4, the offset 300 of the piston portion 220 occurs when a fluid under sufficient pressure is received in the chamber 264. If force from the fluid pressure in the chamber 264 is sufficient to overcome the force of the spring 280, the output member 220 (and the entire piston portion 220) is shifted forward in the axial direction. In some embodiments, the fluid pressure that is required to overcome the spring force may be approximately predetermined from the spring constant, the desired offset 300, the dimensions of the chamber 264, and other such factors. As previously described, the fluid supply input 150 receives the fluid from the reservoir (not shown in FIGS. 3-4). The fluid passes through the fluid supply channel 152, through the outlet 160 and the face seal 260, through the fluid channel 262, and into the chamber 264. The mechanical seal at the face seal 260 assures that the fluid properly reaches the chamber 264, and when the fluid is in the chamber 264, the seal 290 prevents the fluid from passing through the potential leak path along the circumferential surface 249 (FIG. 2).

In this embodiment of the clutch member 200 depicted in FIGS. 3-4, the piston portion 220 serves as both the portion that engages the drive pulley 100 (via the clutch material 277) and the portion that receives an output device (such as a fan). The output device mounted to the studs 230 of the piston portion 220 may also be shifted in the axial direction as the piston portion 220 is shifted, but the offset 300 in the axial direction may be relatively small such that this shifting motion has little or no impact on the output device. Similarly, the offset 300 in the axial direction may be relatively small such that the shifting motion of the output member 222 relative to the hub 242 has little or no impact on the longevity and performance of the seal 190 and the wiper 191. It should be understood that the displacement between the clutch material 277 and the engagement surface 237 may change slightly as the clutch material 277 is worn away through normal use.

In another embodiment of the invention, the drive member 100 may have a configuration other than a drive pulley shown in FIGS. 1-4. For example, the drive member 100 may be a shaft or gear that is powered by a motor. In such embodiments, the clutch member 200 may have a mounting configuration to removably attach to the shaft or gear or may have an adapter member connected therebetween.

In other embodiments, the output member 222 of the clutch member 200 may be configured to receive an output device other than fan blades. For example, the output member 222 may be configured to connect with other components that are to be selectively rotated, such as output shafts, gears, brake systems, and the like.

In yet another embodiment, the spring 280 that biases the piston portion 220 in an axial direction is not limited to a single, coiled spring shown in FIGS. 1-4. Rather, the spring 280 can be any biasing member that can urge the piston portion 220 in the axial direction. A suitable biasing member may comprise one or more coil springs, leaf springs, gas springs, solid materials having appropriate elasticity properties, or the like.

Furthermore, some embodiments of the invention may include a clutch member configuration such that spring 280 urges the piston portion 220 to disengaged position (where the engagement surface 237 is offset from the clutch material 277). In such embodiments, the chamber 264 may be configured such that fluid pressure therein causes the piston portion 220 to shift toward engaged position (where the engagement surface 237 is pressed against the clutch material 277).

In other embodiments, the clutch material 277 may be integral with the fixed plate 275 or the drive member 100. In these embodiments, the engagement surface 237 of the piston portion 220 would engage with an opposing surface on the fixed plate 275 of the drive member 100.

In another embodiment, the clutch material may be mounted to the piston portion 220 such that the clutch material selectively engages with an opposing surface (e.g., the clutch material 277, the fixed plate 275 or the drive member 100). In such an embodiment, an engagement surface on the clutch material would contact the opposing surface.

A number of embodiments of the invention have been described. Nevertheless, it will be understood that various modifications may be made without departing from the spirit and scope of the invention. Accordingly, other embodiments are within the scope of the following claims.

What is claimed is:

1. A fan clutch device to be removably mounted to a drive member, the fan clutch device comprising:
   a hub portion that, when the fan clutch device is mounted to a drive member, is selectively movable relative to the drive member, the hub portion having a first spring-engaging surface; and
   a piston portion adjustable in an axial direction relative to the drive member when the fan clutch device is mounted to a drive member, the piston portion being adjustable between first and second positions, the piston portion having a second spring-engaging surface that opposes the first spring-engaging surface;
   a fluid-receiving space located within the clutch device, the space being defined at least partially by surfaces of the hub portion and the piston portion; and
   a single spring device abutting against the first spring-engaging surface of the hub portion and the second spring-engaging surface of the piston portion to urge the piston portion toward one of the first position and the second position, wherein the single spring device is coaxially arranged with at least one of the hub portion and the piston portion.

2. The device of claim 1, wherein, when the fan clutch device is mounted to the drive member, the fan clutch device is removable from the drive member without disassembly of the hub portion from the piston portion.

3. The device of claim 1, wherein the fan clutch device has a self-contained construction such that the hub portion, the piston portion, and the single spring device remain assembled together without a separate clamp device when the fan clutch device is separated from the drive member.

4. The device of claim 1, wherein when the fan clutch device is mounted to a drive member, the hub portion is selectively movable in a rotational direction relative to the drive member and substantially stationary in an axial direction relative to the drive member.

5. The device of claim 1, wherein the piston portion is selectively movable in the axial direction relative to the hub portion and is substantially rotationally stationary relative to the hub portion.

6. The device of claim 1, wherein a single sealed leak path borders a periphery of the fluid-receiving space between the piston portion and the hub portion to seal the fluid-receiving space from ambient air.

7. The device of claim 6, further comprising a seal member disposed in the sealed leak path along the periphery of the fluid-receiving space between the piston portion and the hub portion, the seal member being non-rotational relative to the piston portion and the hub portion.

8. The device of claim 1, wherein the piston portion selectively couples with the drive member when the fan clutch device is mounted to a drive member, and the piston portion includes one or more connectors that receive an output device to be selectively rotated.

9. A fan clutch system, comprising:
   a drive member that rotates about a rotational axis;
   a clutch device removably mounted to the drive member, the clutch device comprising:
      a hub portion that is selectively movable relative to the drive member, the hub portion having a spring-engaging surface;
      a piston portion adjustable in an axial direction relative to the drive member between a first position and a second position, the piston portion having an opposing spring-engaging surface;
      a fluid-receiving chamber defined at least partially by surfaces of the hub portion and the piston portion, wherein a single sealed leak path borders a periphery of the fluid-receiving space between to seal the fluid-receiving space from ambient air; and
      a single spring device arranged between the spring-engaging surface of the hub portion and the opposing spring-engaging surface of the piston portion to urge the piston portion toward one of the first position and the second position,
      wherein the single spring device is axially aligned with the rotational axis of the drive member.

10. The system of claim 9, wherein the fan clutch device is removable from the drive member without disassembly of the hub portion from the piston portion.

11. The system of claim 10, wherein the fan clutch device has a self-contained construction such that the hub portion and the piston portion remain assembled to one another without a separate clamp device when the fan clutch device is separated from the drive member.

12. The system of claim 9, wherein the single spring device comprises a biasing member selected from the group consisting of a coil spring, a leaf spring, and a gas spring.

13. The system of claim 9, wherein the single spring device is coaxially arranged with at least one of the hub portion and the piston portion.

14. The system of claim 9, wherein the hub portion is selectively movable in a rotational direction relative to the drive member and substantially stationary in an axial direction relative to the drive member.

15. The system of claim 9, wherein the piston portion is selectively movable in the axial direction relative to the hub portion and is substantially rotationally stationary relative to the hub portion.

16. The system of claim 9, further comprising a seal member disposed in the sealed leak path along the periphery of the fluid-receiving chamber, the seal member being non-rotational relative to the piston portion and the hub portion.

17. The system of claim 9, further comprising a single set of fasteners to removably mount the clutch device to the drive member.

18. A fan clutch system, comprising:
a drive member that rotates;
a clutch device removably mounted to the drive member, the clutch device comprising:
a hub portion that is selectively movable relative to the drive member;
a piston portion adjustable in an axial direction relative to the drive member between first and second positions, wherein the piston portion includes a clutch surface that selectively couples with the drive member; and
a fan blade device mounted to the piston portion, the fan blade device being rotated with the drive member when the clutch engagement surface of the piston portion selectively couples with the drive member.

19. The system of claim 18, wherein the clutch device further comprises a single spring device arranged between at least a portion of the hub portion and at least a portion of the piston portion to urge the piston portion toward one of the first position and the second position.

20. The system of claim 18, wherein the fan clutch device is removable from the drive member without disassembly of the hub portion from the piston portion.

21. A fan clutch device for removably mounting to a drive pulley, the fan clutch device comprising:
a mounting member that directly engages with a drive pulley when the fan clutch device is mounted to the drive pulley;
a hub portion that is selectively movable relative to the drive pulley when the fan clutch device is mounted to the drive pulley; and
a piston portion adjustable in an axial direction relative to the drive pulley between a first position and a second position when the fan clutch device is mounted to the drive pulley;
an output surface engageable with a fan blade device, the output surface facing away from the drive pulley when the fan clutch device is mounted to the drive pulley so that each of the hub and piston portions are arranged between the fan blade device and the drive pulley when the fan clutch device is mounted to the drive pulley; and
an annular portion that is rotationally coupled with the output surface and positioned away from the output surface toward the drive pulley when the fan clutch device is mounted to the drive pulley, the annular portion defining an inner circumferential surface arranged radially outward of an opposing outer circumferential surface defined by the mounting member,
wherein, when the fan clutch device is mounted to the drive pulley, the fan clutch device is removable from the drive pulley without disassembly of the hub portion from the piston portion.

22. The device of claim 21, wherein the piston portion includes a clutch surface that selectively couples with the drive pulley when the fan clutch device is mounted to the drive pulley, and the piston portion including the output surface that is engageable with the fan blade device.

23. The device of claim 21, wherein the clutch device further comprises a single spring device to urge the piston portion toward one of the first position and the second position, the single spring device being a coil spring that is coaxial with the hub portion and the piston portion.

24. The device of claim 21, wherein the mounting member attaches to the drive pulley with a set of bolts when the fan clutch device is mounted to the drive pulley.

25. The device of claim 24, wherein when the fan clutch device is mounted to the drive pulley, the mounting member rotates with the drive pulley as the drive pulley rotates about a support shaft.

26. The device of claim 25, further comprising a first clutch surface coupled to the mounting member so that the first clutch surface rotates with the drive pulley when the fan clutch device is mounted to the drive pulley, and further comprising a second clutch surface that selectively engages the first clutch surface in response to adjustment of the piston portion in the axial direction toward one of the first position and the second position.

27. The device of claim 21, wherein when the fan clutch device is mounted to the drive pulley, the hub portion is selectively movable in a rotational direction relative to the drive pulley and substantially stationary in an axial direction relative to the drive pulley.

28. The device of claim 21, wherein the piston portion selectively movable in the axial direction relative to the hub portion and substantially stationary in the rotation direction relative to the hub portion.

29. The device of claim 21, wherein the fan clutch device has a self-contained construction such that the hub portion and the piston portion remain assembled to one another without a separate clamp device when the fan clutch device is separated from the drive pulley.

30. The device of claim 29, further comprising at least one locking member mounted to the hub portion such that hub portion and the piston portion may be disassembled from one another upon removal of the at least one locking member.

31. The device of claim 21, further comprising a fluid-receiving space located within the clutch device, the space being defined at least partially by a surface of the piston portion.

32. The device of claim 31, wherein the fluid-receiving space is in fluid communication with fluid channel that extends along a central axis away from the drive pulley and toward the piston portion.

33. The device of claim 32, wherein the fluid channel is at least partially defined by a face seal that abuts with a support shaft of the drive pulley when the fan clutch device is mounted to the drive pulley.

34. The device of claim 33, wherein the fluid channel directs pressurized air into the fluid-receiving space so as to act upon the piston portion when the fan clutch device is mounted to the drive pulley.

35. The device of claim 31, wherein a single sealed leak path borders a periphery of the fluid-receiving space to seal the fluid-receiving space from ambient air.

36. The device of claim 32, further comprising a seal member disposed in the sealed leak path along the periphery of the fluid-receiving space between the piston portion and the hub portion, the seal member being non-rotational relative to the piston portion and the hub portion.

37. The device of claim 21, further comprising a spring device to urge the piston portion toward one of the first position and the second position, the spring device being arranged radially outward of a bearing coupled to the hub portion.

38. The device of claim 37, wherein the spring device is an individual coil spring that is positioned radially outward and coaxial with the bearing.

39. The device of claim 21, wherein the piston portion extends radially outward of the hub portion.

40. The device of claim 21, wherein the inner circumferential surface of the annular portion is arranged radially outward of a bearing coupled to the hub portion.

41. The device of claim 21, wherein the annular portion is at least partially defined by a spring-engaging member, the spring engaging member including a radial surface that engages a spring device.

42. The device of claim 41, wherein the piston portion comprises an assembly of at least the spring-engaging member that at least partially defines the annular portion and an output member that at least partially defines the output surface.

43. The device of claim 21, further comprising the fan blade device to engage with the output surface so that the fan blade device spins with the output surface.

44. A fan clutch device for removably mounting to a drive member, the fan clutch device comprising:

a hub portion that is selectively movable relative to a drive member when the fan clutch device is mounted to the drive member; and a piston portion adjustable in an axial direction relative to the drive member between a first position and a second position when the fan clutch device is mounted to the drive member, wherein the piston portion includes a clutch surface that selectively couples with the drive member when the fan clutch device is mounted to the drive member, and the piston portion receives a fan blade device mounted thereto; and wherein, when the fan clutch device is mounted to the drive member, the fan clutch device is removable from the drive member without disassembly of the hub portion from the piston portion.

45. The device of claim 44, wherein when the fan clutch device is mounted to the drive member, the hub portion is selectively movable in a rotational direction relative to the drive member and substantially stationary in an axial direction relative to the drive member.

46. The device of claim 44, wherein the piston portion selectively movable in the axial direction relative to the hub portion and substantially stationary in the rotation direction relative to the hub portion.

47. The device of claim 44, wherein the fan clutch device has a self-contained construction such that the hub portion and the piston portion remain assembled to one another without a separate clamp device when the fan clutch device is separated from the drive member.

* * * * *